United States Patent Office 3,740,361
Patented June 19, 1973

3,740,361
DENTURE ADHESIVE COMPOSITION AND PROCESS OF PREPARING THE SAME
Oskar Altwirth, Hoher Markt 18,
Ried im Innkreis, Austria
No Drawing. Continuation-in-part of application Ser. No. 90,879, Nov. 18, 1970. This application July 10, 1972, Ser. No. 270,472
Claims priority, application Austria, Dec. 1, 1969, A/11,179
Int. Cl. C08f 45/36
U.S. Cl. 260—17.4 ST                    7 Claims

ABSTRACT OF THE DISCLOSURE

A denture adhesive composition consisting of a spreadable mixture of sodium alginate and an ethanol solution of a normally solid polyvinyl acetate resin, the solution being a 50—50 mixture of ethanol and resin, and about ten parts of the solution being used per seven parts of the alginate.

---

This is a continuation-in-part of my copending application Ser. No. 90,879, filed Nov. 18, 1970 and now abandoned.

This invention relates to an adhesive for artificial dentures or the like, and a process of preparing the same.

Adhesion-promoting agents are known which contain an alginate. These known adhesion-promoting agents consist in most cases of a powder, which is applied to the dorsal surface of the denture. The aliginate absorbs the moisture of the mucous membrane and changes the viscosity of the saliva present below the denture so that the adhesion is promoted. On the other hand, such an adhesion-promoting agent has only a relatively short time of action, because, although the alginate initially applied as a powder swells and becomes adhesive in the mouth, it will soon be rinsed off when food and beverages are consumed, particularly when a relatively high chewing pressure is required. It is also known to add alginates to a pastelike carrier substance, preferably petrolatum. This practice involves the same disadvantages, particularly because the carrier substance too is not durable, e.g., when a hot food or a hot beverage enters the mouth. In both cases, it is undesirable that the alginates and any carrier substance are swallowed with the saliva since this may be injurious to the health. Backing compounds are known to increase the backing area for the denture but they have no adhesion-promoting or adhesive function and, for this reason, remain virtually ineffective in most cases. In view of these facts, it has not been possible before to use full upper dentures having no palate plate and partial dentures having no clamps or other retaining elements, although palate plates, clamps and the like are particularly annoying elements of a denture.

It is an object of the invention to provide for artificial dentures an adhesive which provides a durable adhesion of the dentures to the gums and, consequently, makes possible the use of artificial dentures and the like having no palate plates and clamps.

The adhesive according to the invention consists essentially of a spreadable mixture of an alkali metal alginate and an ethanol solution of a normally solid polyvinyl acetate resin. When this varnish-like mixture is applied to the artificial denture, the alcohol evaporates and a hard film-like layer remains. When the denture has been inserted into the mouth, the alginate absorbs the moisture from the mucous membrane so that the gum portions disposed under the denture are dried and the alginate itself becomes adhesive. At the temperature in the mouth, the normally solid polyvinyl acetate resin, becomes soft and adhesive, too, so that the denture adheres firmly and durably to the supporting gum portion, which has been dried. It is important that the alginate is not rinsed off because it is embedded in the solid resin. As a result, the alginate cannot enter the stomach and digestive system.

To prepare the adhesive according to the invention, the normally solid resin is kneaded for some time at a temperature above its softening point, whereafter alcohol is gradually added, the kneading is resumed, and the alginate is finally admixed, after which the mixture is cooled to below the softening point of the resin. Alcohol should always be added in such an amount that the prepared adhesive is spreadable or has the consistency of a varnish at room temperature.

The invention will be explained more fully in the following example:

To prepare an adhesive for artificial dentures, a matrix material was used which consisted of polyvinyl acetate having a softening point of about 70° C., a K-value of about $51\pm4$ (according to DIN 53,726), a specific weight of 1.12, and a degree of polymerization of 850 (determined by osmotic measurement). This resin is solid and plastic at normal temperature. It is sold by Wacker-Chenue, Munich, Germany, under the trademark VINNAPAS B500/20VL. The normally solid resin was divided into lumps which had about the size of a walnut and were slowly fed to a universal mixing and kneading machine and kneaded at about 100° C. for 10–15 minutes. The resin was then cooled to 50–60° C. Thereafter, ethyl alcohol of 96% purity was added in increments within 20 minutes into the covered mixing trough, a total of 50 parts of polyvinyl acetate being mixed or diluted with 50 parts of ethyl alcohol, by weight. The resulting solution or mixture was then homogenized for about 20 minutes. Ten parts by weight of this liquefied polyvinyl acetate mass was then admixed with 7 parts by weight of sodium alginate, and the mixture was cooled to normal temperature, i.e. about 20° C. The resulting composition is similar to a varnish and can be applied with a brush to the dorsal surface of an artificial denture or the like, on which it hardens to form a solid film-like coating as a result of the evaporation of the alcohol.

What is claimed is:

1. A denture adhesive composition consisting of a spreadable mixture of about seven parts, by weight, of an alkali metal alginate and about ten parts, by weight, of a polyvinyl acetate resin in ethyl alcohol, the resin being solid at normal temperature and sufficient alcohol being admixed to the resin to make the entire mixture of spreadable consistency.

2. The denture adhesive composition of claim 1, wherein the alginate is sodium alginate.

3. The denture adhesive composition of claim 1, wherein about equal parts by weight of the resin and the alcohol are admixed.

4. The denture adhesive composition of claim 1, wherein the resin is a polyvinyl acetate having a softening point of about 70° C., a K-value of about $51\pm4$, a specific weight of 1.12, and a degree of polymerization of 850.

5. A process of preparing a denture adhesive composition, which comprises the steps of subjecting a polyvinyl acetate resin which is solid at normal temperature to kneading at a temperature above the softening point of the resin, thereafter cooling the resin to a temperature below the softening point thereof, gradually adding ethyl alcohol to the cooled resin, further kneading the resin to which the ethyl alcohol has been added to form an ethanol solution of said resin, and admixing an alkali metal alginate to the solution to form a mixture of said alginate and said solution, sufficient ethyl alcohol having been added to make the mixture spreadable.

6. The process of claim 5, wherein the softening point of the resin is about 70° C., the resin is first kneaded after having been heated to a temperature of about 100° C., the resin is cooled to a temperature of about 50° C. to 60° C. before the ethyl alcohol is added, and the mixture is finally cooled to the normal temperature.

7. The process of claim 5, wherein about equal parts by weight of resin and alcohol are mixed together.

References Cited

UNITED STATES PATENTS

| | | | |
|---|---|---|---|
| 2,364,738 | 12/1944 | Marberg et al. | 260—9 |
| 3,511,791 | 5/1970 | Puetzer et al. | 260—17.4 |
| 3,575,915 | 4/1971 | Novak et al. | 260—29.6 |

WILLIAM H. SHORT, Primary Examiner

L. L. LEE, Assistant Examiner

U.S. Cl. X.R.

106—35; 260—86.1 R, DIG. 36